United States Patent [19]

Peikin

[11] Patent Number: 4,782,617
[45] Date of Patent: Nov. 8, 1988

[54] WATER TEMPERATURE MEASUREMENT APPARATUS

[76] Inventor: Aaron J. Peikin, 315 N. Wayne Ave., Wayne, Pa. 19087

[21] Appl. No.: 922,876

[22] Filed: Oct. 24, 1986

[51] Int. Cl.$^4$ ............... A01K 89/00; A01K 79/00
[52] U.S. Cl. ............................... 43/18.1; 43/4; 43/25
[58] Field of Search ............ 43/4, 4.5, 17.1, 18.1, 43/25

[56] References Cited

U.S. PATENT DOCUMENTS

| | | |
|---|---|---|
| 51,879 | 1/1866 | Stafford . |
| 72,539 | 12/1867 | Reber . |
| 233,906 | 11/1880 | Adams . |
| 2,570,879 | 10/1951 | Steel . |
| 3,031,788 | 5/1962 | Shannon . |
| 3,561,267 | 2/1971 | Costello ................... 43/4 |
| 3,683,356 | 8/1972 | D'Amore ............... 43/17.1 |
| 3,763,588 | 10/1973 | Foster . |
| 3,785,079 | 1/1974 | Rohn ......................... 43/4 |
| 3,874,108 | 4/1975 | Connor ..................... 43/25 |
| 3,968,586 | 7/1976 | Peterson ................. 43/4.5 |
| 4,050,180 | 9/1977 | King ........................... 43/4 |
| 4,104,917 | 8/1978 | Rieth et al. . |
| 4,244,220 | 1/1981 | Henson et al. . |
| 4,445,178 | 4/1984 | Scheer et ala. ............ 43/4 |
| 4,621,447 | 11/1986 | Rhodes ................... 43/18.1 |
| 4,625,447 | 12/1986 | Buchanan .............. 43/17.1 |

FOREIGN PATENT DOCUMENTS 58-79124 5/1983 Japan .

*Primary Examiner*—M. Jordan
*Attorney, Agent, or Firm*—Benasutti & Murray

[57] ABSTRACT

A water temperature measuring device includes a temperature sensor which is located adjacent one end of an elongated member such as a hiking/wading staff or a fishing rod. A temperature readout device is located in the vicinity of the other end of the elongated member. The output of the temperature sensor is electrically coupled to the temperature readout device which is powered by an electric storage battery or a solar power supply contained in a handle of the hiking/wading staff or fishig rod. In another embodiment, the temperature readout device is located in a fishing reel which is mounted on the handle of the fishing rod. Mounting of the reel on the rod causes the making of electrical contact between the readout device and the temperature sensor and power source.

9 Claims, 2 Drawing Sheets

WATER TEMPERATURE MEASUREMENT APPARATUS

BACKGROUND OF THE INVENTION

This invention relates to apparatus for use by outdoorsmen and more particularly to apparatus for use by a fisherman and others desiring to measure water temperature at preselected locations and depths.

It is known that fish are more prone to feeding when water is at a certain temperature or within a certain temperature range. Consequently, many serious fishermen carry thermometers or other temperature measuring devices to enable them to determine when and where the fish are most likely to bite. These temperature measurement devices typically take the form of a thermometer connected to the end of a string. The thermometer is thrown into the water while grasping the string in order to measure the temperature at predetermined locations and depths. This is a rather inconvenient procedure which requires carrying another piece of gear, i.e. and string the thermometer, retrieving the thermometer from the pocket or other storage location, unraveling the string, throwing the thermometer into the water, and letting it sink to the desired depths.

In addition to being inconvenient the procedure is unsatisfactory in that it is often difficult to insure that the thermometer has been positioned at the desired location and depth and maintain the thermometer at that position. For example, in swift currents, the thermometer will have a tendency to drift thereby making it difficult to measure the temperature at the desired location and depth. Even if it is possible to place the thermometer in the desired position, it must remain there for a period of the sufficient to permit the thermometer reading to stabilize. Once again this is difficult in locations where the water is in motion. Finally, after the temperature reading has stabilized, the thermometer must be retrieved by winding in the string then returning the apparatus to its storage location after reading the indicated temperature. Quite often, this procedure entails the use of both hands. Consequently, it is difficult to hold other objects, for example a fishing pole, at such times.

It is therefore an object of the present invention to provide a water temperature measuring device which is readily accessible and easy to use.

It is another object of the present invention to provide a water temperature measuring device which will measure temperature at a desired location and depth.

It is yet another object of the present invention to provide a water temperature measurement device which enables the user to make substantially continuous temperature readings while repositioning the temperature sensor.

It is still another object of the present invention to provide a water temperature measuring device which enables the user to locate regions having a desired temperature within a body of water.

These and other objects of the present invention will become apparent to those skilled in the art upon consideration of the following description of the invention.

SUMMARY OF THE INVENTION

The present invention comprises a water temperature measuring device in which a temperature sensor is located adjacent one end of an elongated member such as a hiking/wading staff or a fishing rod. A temperature readout device is located in the vicinity of the other end of the elongated member. The output of the temperature sensor is coupled to the temperature readout device by appropriate means supported in or on the elongated member.

In one embodiment, the temperature sensor is embedded in the tip of a fishing rod. The temperature readout is, for example, a light emitting diode (LED) or liquid crystal display (LCD) positioned in the rod handle or shaft adjacent the handle. A sensor wire, connecting the temperature sensor to the readout, is, for example, embedded in, laid upon or wrapped around the fishing rod between the tip and handle. The power source is a battery stored in the handle of the fishing rod, a solar power source embedded in the handle or a combination where the solar power source is used to recharge the battery. In an alternate preferred embodiment, the temperature readout display is disposed in the fishing reel. The readout can be, for example, LCD or LED display. Attachment of the reel to the fishing rod causes the making of electrical contacts thereby connecting the sensor and power source to the display.

In still another alternate preferred embodiment, the temperature sensor is disposed in the tip of a hiking/wading staff or camera monopod. The display is located in the handle of the staff or monopod and is electrically connected to the sensor, for example, by means of wires embedded in, laid upon or wrapped around the staff or monopod, between the tip and handle. In this embodiment, the readout is, for example, an LCD or LED display disposed in the rod handle with a power source being either a battery or a solar power source disposed in the handle or both, in those embodiments in which the battery is recharged by the solar power source.

Other objects, features and advantages of the present invention will become more fully apparent from the following detailed description of the preferred embodiment, the appended claims and the accompanying drawing.

BRIEF DESCRIPTION OF THE DRAWING

FIG. 6 is a side view of an alternate preferred embodiment of the present invention comprising the temperature measurement incorporated in a hiking/wading staff-camera monopod in accordance with the present invention.

DETAILED DESCRIPTION OF THE PREFERRED EMBODIMENT

Figure 1:
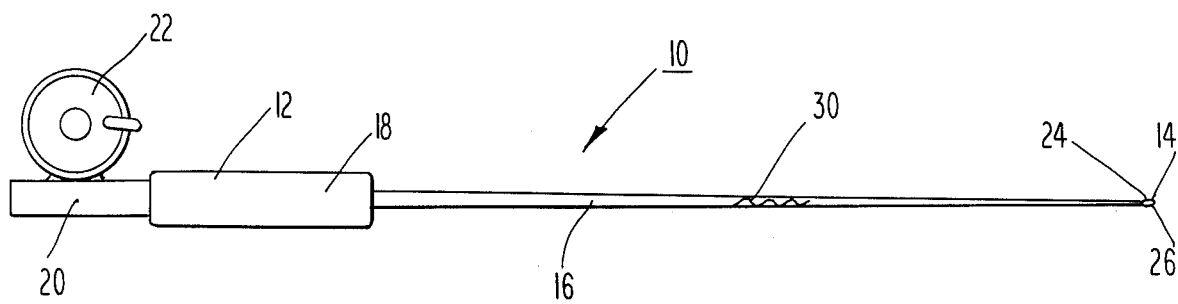
FIG. 1 is a side view of a fishing rod incorporating a temperature measurement apparatus in accordance with the present invention.

Although specific forms of the invention have been selected for illustration in the drawing, and the following description is drawn in specific terms for the purpose of describing these forms of the invention, this description is not intended to limit the scope of the invention which is defined in the appended claims.

Referring to FIG. 1, there is shown a side view of a fishing rod, generally designated 10, incorporating the temperature measurement apparatus in accordance with the present invention. The fishing rod 10 comprises a handle portion 12, a tip portion 14 and a shaft rod portion 16 extending between the handle segment 12 and the tip portion 14. The handle segment 12 has a grip segment 18 and a reel mounting segment 20. A reel 22 is removeably mountable on the reel mounting segment 20.

A temperature measurement sensor 24 is positioned adjacent the tip portion 14 of the fishing rod 10. In the preferred embodiment, the temperature measurement sensor 24 preferably comprises a transducers which convert temperature measurements to electrical signals such as, for example, a thermocouple which is embedded in the tip of the rod portion 16 of the fishing rod 10. Alternatively, the temperature measurement sensor 24 can be mounted on the surface of the rod 16 adjacent to tip portion 14 or mounted as part of an eyelet 26 which is attached to the tip portion 14 of the fishing rod 10.

The temperature sensor signal is electrically connected to a readout device 28 (see FIG. 2) through appropriate electrical interface circuitry by electrically conductive means such as, for example, wires 30 which extend along the shaft 16 of the fishing rod 10. The wires may be wrapped around and affixed to the shaft 16, embedded in the shaft or disposed in a conduit within the shaft 16. The electrically conductive means can alternately comprise carbon elements embedded in the shaft portion 16. Electrical interface circuitry required to convert the electrical signal from the temperature sensor 24 to a digital readout format as displayed by the LCD or LED readout device 28, is preferably contained within the handle segment 18.

Figure 2:
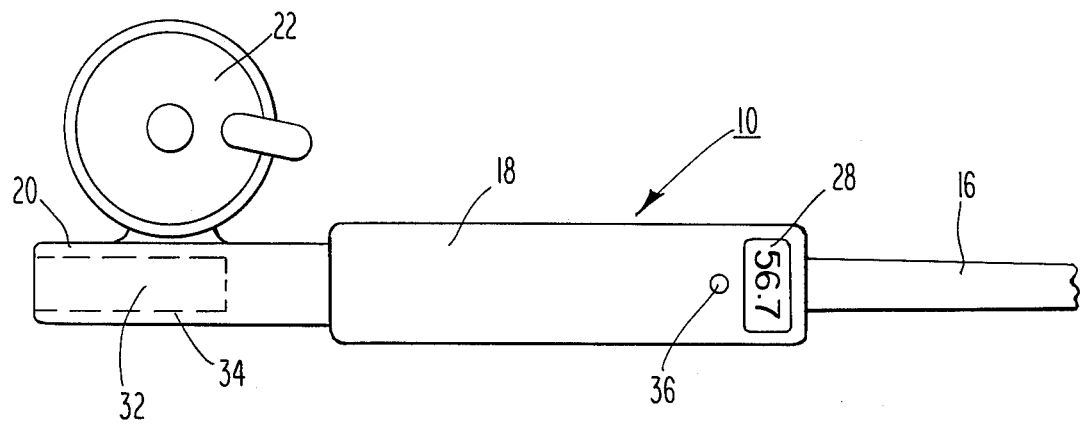
FIG. 2 is a partial side view of the fishing rod of FIG. 1 showing a preferred location of a readout device and power source of the temperature measurement apparatus in accordance with the present invention.

Referring now to FIG. 2, there is shown a temperature readout 28 disposed in the handle segment 18 adjacent the shaft 16. The temperature readout device 28 is, for example, a liquid crystal display (LCD) which continuously displays the temperature sensed by the temperature sensor 24. Backlighting, powered by an electrical power source, such as a battery 32 disposed in a battery compartment 34 located within the reel holding mounting segment 20 of the fishing rod 10 is preferably provided to illuminate the LCD under low ambient light conditions. The backlighting can be selectively turned on by means of a switch, for example a push button switch 36 disposed in the handle segment 18 in a location which is conveniently operable by a thumb or finger. Alternatively, the temperature readout device can be a light emitting diode (LED) display which is powered by an electrical power source such as a battery 32 disposed within the battery compartment 34. The LED display can be selectively illuminated by activating a switch, for example the push button switch 36, disposed in the handle portion 18.

Figure 3:
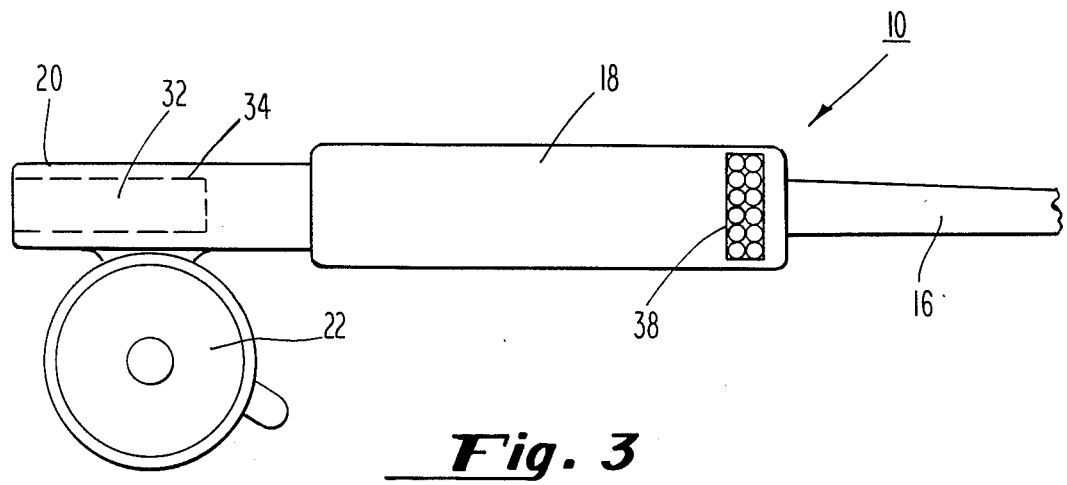
FIG. 3 is a view of the side opposite to that shown in FIG. 2 showing a preferred location of a solar power source of the temperature measurement apparatus in accordance with the present invention.

Referring now to FIG. 3, there is shown a solar power source 38 disposed in the handle portion 18 adjacent the shaft portion 16 of the rod 10. The solar power source preferably comprises at least one solar cell which converts sunlight into electrical power. The solar power source 38 can be used to power backlighting for an LCD temperature readout device; as power for an LED display; or as power to recharge a rechargeable battery 32 disposed in the battery compartment 34. The solar power source 38 can also be used in the dual role of supplying power to the temperature readout device 28 as well as to recharge the battery 32.

Figure 4:
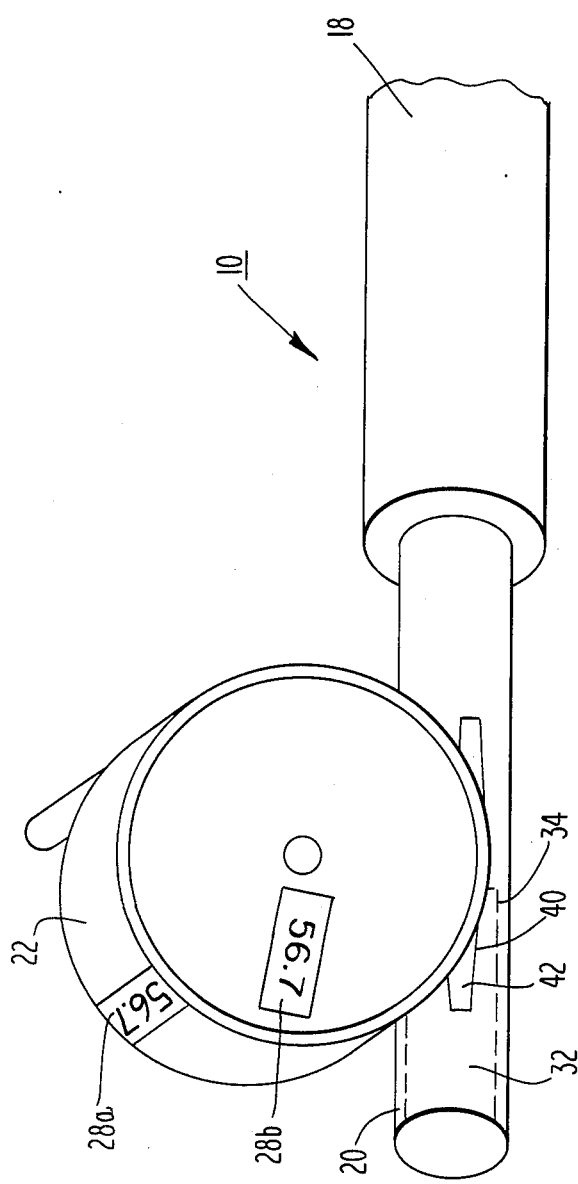

Referring now to FIG. 4, there is shown an alternate preferred embodiment of the present invention wherein the temperature readout device 28 is disposed in the reel 22. The temperature readout device 28 is disposed, for example, on the outer circumference of the reel as indicated by reference numeral 28a. In an alternate embodiment, the readout device located on the reel itself, on the face of the reel opposite the handle, as indicated by reference numeral 28b. In this embodiment, where the temperature readout device 28 is disposed in the reel 22, the reel contains electrical contact means 40 preferably disposed in the reel hold down tabs 42. The electrical contact means 40 preferably comprise a pair of spring loaded metal tabs, such as, for example, metal leaf springs, which are electrically connected to the temperature readout device 28. Mating electrical contact means 44 are disposed in the reel mounting segment 20 of the rod 10 such that when the reel 22 is attached to the reel mounting segment 20, electrical contact is made between the readout device 28, the electrical power source, for example the battery 32 and/or the solar power source 38, as well as the temperature sensor 24. The mating electrical contact means, diposed in the reel mounting segment 20, are preferably spring loaded metal tabs, such as, for example, metal leaf springs. As described above, the electrical contact means 40 and the electrical contact means 44 are positioned respectively in the reel 22 and reel mounting segment 20 such that when the reel 22 is mounted on the reel mounting segment 20, the electrical contact means 40 engage the electrical contact means 44 thereby making electrical contact there between.

Figure 5:
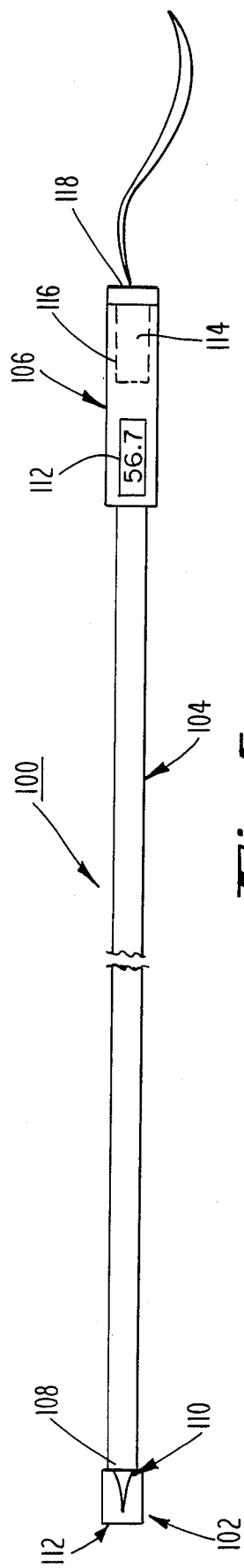
FIG. 5 is a perspective view of a portion of the fishing rod depicted in FIG. 1, showing a temperature readout display incorporated in a removable reel in accordance with an alternate preferred embodiment of the present invention.

Referring now to FIG. 5, there is shown an alternate preferred embodiment of the temperature measurement apparatus disposed in a hiking/wading staff or camera monopod, generally referred to as 100. The staff-monopod 100 comprises a tip portion 102 disposed at one end of a shaft portion 104. A handle portion 106 is disposed at the other end of the shaft portion 104. A temperature sensor 108 is disposed at the tip portion 102. The temperature sensor 108 is preferably a transducer which converts temperature to electrical signals such as, for example a thermocouple device. In a preferred embodiment, the tip portion comprises a metal spike 110 with the temperature sensor 108 mounted within the metal spike 110. Alternatively, the thermocouple device can be mounted on the surface of the spike 110 utilizing a suitable adhesive or other attachment means. In an alternate embodiment, the tip portion 102 comprises a rubber tip 112 surrounding the metal spike 110. The rubber tip 112 can be removable or permanently attached to the end of the shaft portion 104. In this alternate preferred embodiment, the sensor is mounted in or on the shfft portion 104 adjacent the rubber tip 112.

It is preferred that the shaft portion 104 be hollow thereby providing a conduit through which wires (not shown) run in order to electrically connect the temperature sensor 108 signal through electrical interface circuitry to a temperature readout device 112 which is preferably disposed in the handle portion 106 adjacent to shaft portion 104. Alternatively, the wires (not shown) can be disposed in a recess extending along the shaft portion 104 from tip to handle, or the wires can be wrapped around the shaft potion 104 from tip to handle. In this alternate embodiment, the shaft portion can be hollow or solid. A source for providing electrical power to the readout and sensor, for example a battery 114, is disposed in a battery compartment 116 located in the handle portion 106. The battery is replaceable by removing, for example, an end cap 118. For convenience, the end cap 118 may have a thong 120 connected thereto.

In an alternate preferred embodiment, a solar power source (not shown) is disposed in the handle portion 106 adjacent the shaft portion 104 of the staff-monopod 100. The solar power source preferably comprises at least one solar cell which converts sunlight into electrical power. The solar power source can be used to power back lighting for an LCD temperature readout device; as power for an LED temperature readout device; or as a power source to recharge a rechargeable battery 114 disposed in the battery compartment 116. The solar power source can also be used in the dual role of suplying power to the temperature readout device 112 as well as to recharge the battery 114.

The temperature readout device 112 is preferably a liquid crystal display (LCD) or a light emitting diode (LED) display. As heretofore described, with respect to the fishing rod embodiment, the LCD display may be equipped with backlighting which is activated by switch means, for example a push button switch (not shown). Similarly, the LED display can be selectively energized by activating the aforementioned switch means. In an alternate embodiment, the readout device 112 can be activated by rotating the cap 118 or by other types of convenient switch means. Electronic circuitry required to convert the electrical signal from the temperature sensor to a digital readout format, as displayed by the LCD or LED, is preferably contained within the handle portion 106. In an alternate embodiment, the readouts can be activated by rotating the cap 118 or by other types of convenient switch means.

As can be seen, the alternate embodiments of the present invention described above enables the user to insert the temperature sensor into the body of water at a desired location and maintain the sensor in position regardless of currents or other forces tending to move the sensor, thereby permitting the user to obtain a precise temperature reading at that location. Alternatively, the user can move the sensor around in the body of water while at the same time reading the temperature in order to find a location which has a temperature at which the fish are prone to feeding.

A fisherman can make particularly advantageous use of the fishing rod embodiment described above by placing the sensor in the water and searching for a location having a desirable temperature. Once that location is found, the user withdraws the rod and casts to that location. The fisherman may also used the wading staff embodiment to advantage by holding the staff in one hand and finding the location having the desired temperature then casting to that location by means of the fishing rod held in the other hand.

It will be understood that various changes in the details, materials and arrangement of the part which have been herein described and illustrated in order to explain the nature this invention, may be made by those skilled in the art within the principal and scope of the invention as expressed in the following claims.

I claim:

1. In a fishing rod comprising a shaft portion having a tip portion at one end and a handle portion at the other end, said handle portion comprising a grip segment and a reel mounting segment, and a reel removably mounted on said reel mounting segment, an improvement comprising:
    (a) temperature sensing means disposed adjacent said tip portion;
    (b) temperature readout means disposed in said reel;
    (c) first electrical contact means disposed in said reel, said first electrical contact means being electrically connected to said temperature readout means;
    (d) second electrical contact means disposed in said reel mounting segment, positioned in electrical contacting relationship with said first electrical contact means when said reel is mounted on said reel mounting segment;
    (e) an electrical power source; and
    (f) means for electrically interconnecting said temperature sensing means, said second electrical contact means and said electrical power source.

2. The fishing rod in accordance with claim 1 wherein said temperature sensing means comprises a thermocouple.

3. The fishing rod in accordance with claim 2 temperature readout means comprises a liquid crystal 4. The fishing rod in accordance with claim 2 wherein said temperature readout means comprises a light emitting diode display.

5. A fishing rod in accordance with claim 2 wherein said electrical power source comprises an electric storage battery removably disposed in a battery compartment in said handle portion.

6. The fishing rod in accordance with claim 2 wherein said electrical power source comprises a solar power source.

7. The fishing rod in accordance with claim 6 wherein said solar power source comprises at least one solar cell disposed in said grip segment of said handle portion.

8. The fishing rod in accordance with claim 2 wherein said electrical power source comprises:
    (a) a rechargeable electric storage battery removably disposed in a battery compartment in said handle portion; and
    (b) a solar power source adapted to recharge said rechargeable electric storage battery 9. The fishing rod in accordance with claim 8 wherein said solar power source comprises at least one solar cell disposed in said grip segment of said handle portion.

* * * * *

UNITED STATES PATENT AND TRADEMARK OFFICE
CERTIFICATE OF CORRECTION

PATENT NO. : 4,782,617

DATED : November 8, 1988

INVENTOR(S) : Aaron J. Peikin

It is certified that error appears in the above-identified patent and that said Letters Patent is hereby corrected as shown below:

Column 1, line 22, delete the word "string" and replace with the word "stringing".

Column 1, line 35, delete the word "the" and replace with the word "time".

Column 2, line 58, delete the number "5" and replace with the number "4".

Column 2, line 63, delete the number "6" and replace with the number "5".

Column 3, line 23, delete the word "transducers" and replace with the word "transducer".

Column 3, line 24, delete the word "convert" and replace with the word "converts".

Column 4, line 63, delete the word "shfft" and replace with the word "shaft".

Column 5, line 24, delete the "suply-" and replace with "supply-".

Signed and Sealed this

Twenty-eighth Day of March, 1989

Attest:

DONALD J. QUIGG

*Attesting Officer*  *Commissioner of Patents and Trademarks*